Oct. 18, 1955

A. ZEH 2,721,024

ELECTROMAGNETICALLY OPERATED PISTON
COMPRESSOR FOR COMPRESSING FLUID

Filed July 28, 1952

INVENTOR.
ALFRED ZEH

BY Frederick E. Hane

ATTORNEY

United States Patent Office 2,721,024
Patented Oct. 18, 1955

2,721,024

ELECTROMAGNETICALLY OPERATED PISTON COMPRESSOR FOR COMPRESSING FLUID

Alfred Zeh, Hamburg, Germany

Application July 28, 1952, Serial No. 301,417

Claims priority, application Germany August 2, 1951

16 Claims. (Cl. 230—55)

The present invention relates to electromagnetically operated piston compressors for the compression of fluids, particularly for compressors of this type suitable for use in connection with household refrigerators and other small refrigerators.

According to a now preferred embodiment of the invention, the compressor comprises a cylinder within which a piston is axially slidable; a mechanical system disposed freely slidable in the direction of the piston axis and including armature means operatively coupled with the piston for displacement in unison therewith; stationarily mounted electromagnetic means including core means and coil means, the said electromagnetic means magnetically coacting with said armature means for effecting reciprocatory movements of the mechanical system and the piston by intermittent energization of the coil means for instance by rectified current impulses; and control means coacting, during operation of the compressor, with the mechanical system for control of the reciprocatory movements thereof. These control means include mechanical means and electric means each arranged to produce a force acting upon the movements of the mechanical system in opposite axial direction, said electric means being controlled by the amplitude of the piston stroke and controlling the relative strength of said opposite forces so as to effect reversal of the piston at the end of its compression stroke substantially in the same axial position relative to the cylinder independently of variations in the amplitude of the piston stroke.

The mechanical means of the control means preferably comprise yieldable means such as a coil spring which stores mechanical energy by the reciprocatory movements of the mechanical system in one direction during the operation of the compressor and releases the same during the movements of the system in the opposite direction, thereby participating in the operational cycle of the compressor. The force opposing the mechanical force of the yieldable means acts directly upon the armature means and is preferably generated by energizing the coil means of the electromagnetic means or an auxiliary coil means associated with the core means with a suitable supplemental or auxiliary current so that the magnetic fields produced by the energization of the main coil means and the auxiliary coil influence the movements of the armature means.

As is well known, with piston compressors actuated by means of a crank shaft the point of reversal of the piston at the end of the compression stroke is always stationary relative to the cylinder. This is not necessarily the case with electromagnetically operated piston compressors. With compressors of this latter type the aforesaid point of reversal of the piston remains stationary only when all the operational conditions under which the compressor operates remain constant. When with electromagnetically operated compressors, as hitherto known, one or more of the operational conditions varies, for instance the potential fed to the electromagnet of the compressor or the required pressure of the compression, the axial position of the point of reversal of the piston within the cylinder changes. Consequently, the piston stroke or the amplitude of movement of the compressor piston varies and hence also the dead space between the bottom of the compressor cylinder and the face of the piston in its position at the end of the compression stroke. As a result, the efficiency of the compressor is reduced thereby limiting the field of application of such compressors.

One of the principal objects of the present invention is to provide an electromagnetically operated piston compressor in which, as already mentioned, the point of reversal of the piston at the end of the compression stroke remains stationary independently of amplitude changes avoiding the disadvantages of conventional electromagnetically operated compressors.

Various attempts have been made to eliminate or at least to reduce the variations in the point of reversal of the piston of electromagnetically operated compressors by providing electrically and mechanically regulating means. However, all the regulating means as hitherto known are so complicated that they tend to neutralize the advantages possessed by electromagnetic compressors by reason of the simplicity and operational reliability of such compressors.

Further objects, features and advantages of the invention will be pointed out hereinafter and set forth in the appended claims forming part of the application.

In the accompanying drawing several now preferred embodiments of the invention are shown by way of illustration and not by way of limitation.

Figure 2:
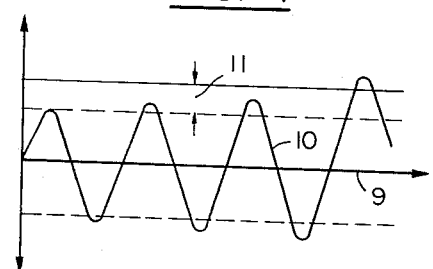
Figs. 2 and 3 are graphs showing the movements of a selected point of the piston of a conventional compressor as a function of time.
Figure 4:
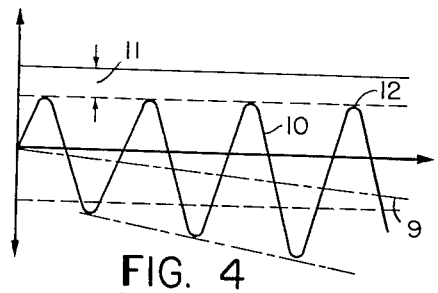
Figs. 4 and 5 are similar graphs showing the movements of a selected point of the piston of a compressor according to the invention as a function of time.
Figure 3:
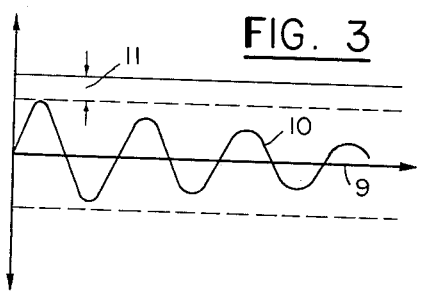
Figure 5:
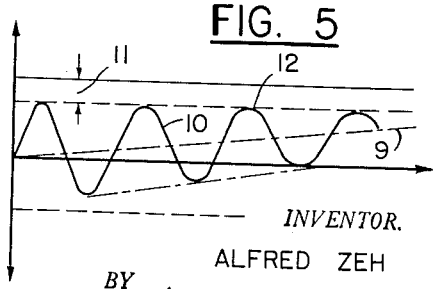

Referring first to Figs. 2 to 5 inclusive in detail, the graphs of Figs. 2 and 4 show an increasing amplitude of the piston stroke and Figs. 3 and 5 show the graphs for a decreasing amplitude of the piston stroke.

In all figures, the medial line of the piston movement is designated by 9 and the movements of the selected piston point as a function of time is designated by 10. As will be observed, the position of line 9 relative to the ordinate of the graph remains unchanged in Figs. 2 and 3 which indicates that the medial position of the piston movement is independent of the amplitude of the piston movement. Fig. 2 further shows that with a piston compressor operated in this manner the dead space designated by 11 becomes smaller and smaller with increasing amplitude and the piston may even strike against the bottom of the cylinder when the value of the amplitude exceeds a certain magnitude. In Fig. 3 the dead space becomes larger and larger with decreasing amplitude resulting in a deterioration of the efficiency and the power of compression of the compressor.

In contrast to Figs. 2 and 3, the graphs of Figs. 4 and 5 show that the position of the medial line 9 of the piston movement relative to the ordinate varies as function of time with the compressor according to the invention. As will now be apparent, this variation of the position of line 9 is indicative of the fact that the medial position of the piston movement is dependent upon the amplitude of the said movement. This relation between the medial position of the piston movement and the amplitude is selected according to the invention so that the point of reversal of the piston upon completion of the compression stroke—which point is designated by 12 in Figs. 4 and 5—is maintained always in the same or substantially the same position on the axis of the piston movement even though the amplitudes of the piston movement may vary. This affords the advantage that the volume of the dead space 11 remains always substantially constant. Of course, the volume of the dead space 11 should always be selected as small as possible.

Figure 1:
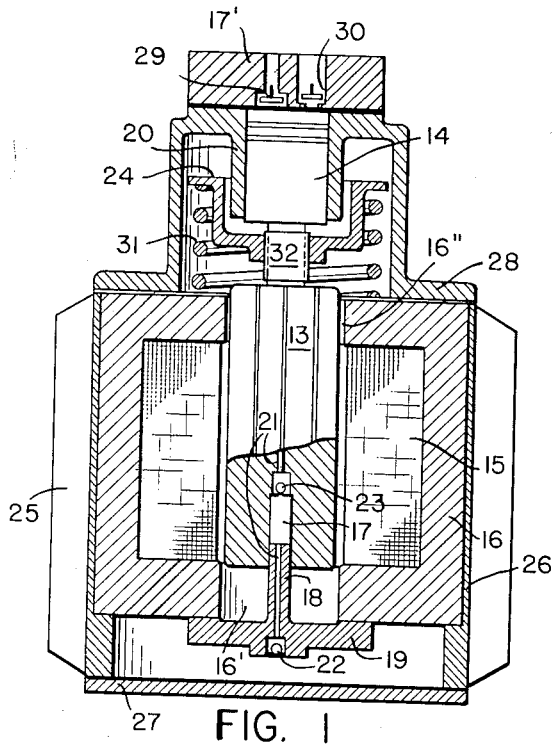
Fig. 1 is an elevational sectional view of an electromagnetic piston compressor according to the invention.

As now will be evident, the basic concept of the invention resides in designing a compressor which satisfies the rule that the point of reversal of the piston at the end of the compression stroke remains stationary relative to a fixed reference point. Fig. 1 which will now be discussed in detail shows a compressor designed in accordance with the aforesaid concept.

The compressor according to Fig. 1 comprises a flanged member 28 secured by any suitable means such as screws to the electromagnet of the compressor. A cylinder 20 is formed in member 28 in which is slidable a piston 14 supported on a short externally threaded piston rod 32 which in turn is secured to an armature 13 of the electromagnet. The piston and the armature form the mechanical system which is freely slidable in axial direction. The armature is cylindrical and is disposed freely slidable within the cylindrical space circumscribed by a cylindrical coil 15 of the electromagnet. The core of the magnet is designated by 16 and is made of any suitable magnetic material. It may either be solid or laminated and is formed to encompass the cylinder wall of coil 15 and also the end faces thereof. As can be clearly seen on Fig. 1, core 16 ends in axially spaced pole faces 16' and 16" facing the armature and coacting with the same.

The rod 32 supports thereon a dished member 24 which can be axially adjusted on the thread of rod 32. A yieldable means such as a coil spring 31 is fitted between member 24 and the adjacent face of core 16. This spring is so loaded that it biases the movable mechanical system toward the position in which the piston is at the end of its compression stroke in which position it is shown in the figure. Member 24 permits to regulate the loading of spring 31 so that it is always conveniently possible to load the spring in accordance with the prevailing operational conditions so that its tension is most favorable to satisfy the condition that the point of reversal of piston at the end of the compression stroke always remains in the same axial position relative to the cylinder.

Fig. 1 further shows that armature 13 is provided with axially extending slots to reduce losses which may occur by eddy currents in the armature. For the same reason core 16 is preferably also provided with axially extending slots. It is also sometimes advantageous to provide a short-circuit winding on armature 13. This winding may be in form of a short-circuit ring.

The mechanical system of the compressor is supported axially slidable in two bearing means one of which is formed by cylinder 20 and piston 14 slidable therein. For the purpose of forming the other bearing means, armature 13 is provided with an axial bore 17 engaged by a stud 18 integral with or secured to a plate 19 which in turn is fastened to core 16 for instance by screws. Bearing stud 18 and armature 13 are formed with axial bores 21 in which are fitted a suction valve 22 and a pressure valve 23. Both valves are shown as ball valves. Core 16 is encompassed by a housing 26 which is sealed by a bottom plate 27 and the flange of member 28. The housing is preferably provided with cooling fins or ribs 25.

The space formed between the bottom plate 27 and the bottom of core 16 is filled with a lubricating oil.

As will be apparent, stud 18 and valves 22 and 23 act in effect as an oil pump when the armature reciprocates so that oil is pumped through bores 21 and fed to the piston for lubricating the same at its surfaces in contact with the cylinder.

A cover 17' is secured for instance by screws to the top of member 28. This cover is provided with two axial bores in which are fitted a suction valve 29 and a pressure valve 30 respectively. The bores should be visualized as communicating with a device in which the pressure fluid produced by the compressor is used. This device may consist for instance of the cooling system of a household refrigerator employing a gaseous condensing medium.

The mechanical force which is exerted by spring 31 upon the mechanical system in the direction of the compression stroke must be balanced by a force acting upon the mechanical system in the opposite direction. This is obviously necessary partly to prevent that the piston strikes against the bottom of the cylinder but primarily to attain the previously explained operation according to the invention. This opposing force is generated by supplementing the magnetic field of coil 15 with a magnetic field which acts upon armature 13 in the direction opposite to the spring and always with such a force that the reversal point of the piston at the end of the compression stroke remains stationary.

The supplemental or auxiliary magnetic force which may also be referred to as pre-magnetizing force can be generated and supplied to the armature by various means.

Figure 6:
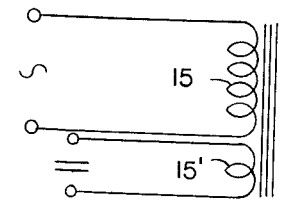
Figs. 6, 7 and 8 are circuit diagrams showing three different circuit systems for producing a supplemental or auxiliary magnetization acting upon the armature means for the purpose of maintaining stationarily the reversal point of the piston at the end of the compression stroke.

According to Fig. 6, an auxiliary coil 15' is provided which is separate from the main coil 15. The main coil is energized with A. C. current while the auxiliary coil is energized with direct current.

Figure 7:
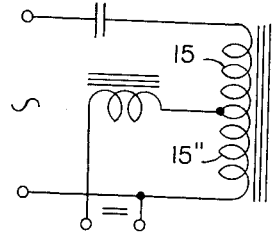

Fig. 7 shows an arrangement in which part 15" of coil 15 is energized with D. C. while the A. C. is connected across the entire coil. As will be apparent the A. C. serves to supply to the compressor the current impulses required for the operation of the same.

Figure 8:
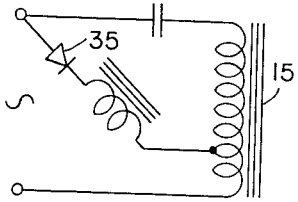

Fig. 8 shows a circuit system in which the entire coil 15 is connected to an A. C. supply and the auxiliary D. C. is produced by connecting an intermediate point of coil 15 through a rectifier 35. Coil 15 may be considered as an auto-transformer in this case. The variations in the potential of the auxiliary current then correspond to the variations in the potential of the A. C. supply.

Coils 15 and 15' of Fig. 6; coils 15 and 15" of Fig. 7; and coil 15 of Fig. 8 should be visualized as occupying the same space as is shown in Fig. 1 for coil 15. The coil arrangements of Figs. 6, 7 and 8 each produce a pulsating force acting upon armature 13 and controlled so as to effect a reversal of the piston at the end of its compression stroke substantially in the same axial position relative to the cylinder independently of variations in the amplitude of the piston stroke.

In many instances it is advantageous to connect coil 15 to an A. C. supply in series with one-way rectifying means. Then coil 15 receives the current impulses required for the operation of the compressor in form of half periods of alternating current passed by the rectifying means. Simultaneously, the current for the auxiliary or supplemental magnetization is obtained by the smoothing of the rectified current as caused by the inductance of coil 15. With such an arrangement the rectified current is equivalent to the current which is obtained when a component of direct current is superimposed by impulses of a stronger current flowing in the same direction. With this arrangement also, variations in the potential of the A. C. supply result in corresponding variations of the current for the auxiliary or pre-magnetization.

The current supply system formed by coil 15 and one-way rectifying means connected in series with this coil obviously result in reciprocating the compressor piston with a frequency which corresponds to the frequency of the A. C. supply. The described arrangement has also the characteristic that it is entirely independent of variations in frequency of such magnitude as they usually occur in electric alternating supply systems.

The auxiliary or pre-magnetization effects withdrawal of the movable mechanical system in the direction away from the bottom of the cylinder with such force that the system can reciprocate in axial direction without the piston striking against the bottom of the cylinder. During the part of an operational cycle in which the mechanical system moves away from the bottom of the cylinder the moving force of the system is produced by the conversion of the electric energy of the supplied current impulses in the pulling force which the electromagnet exerts upon its armature in the aforementioned direction. As a result, spring 31 is compressed thereby storing a corresponding part of the energy supplied by means of the electromagnet. When now the mechanical system in the remaining part of the operational cycle representing the compression stroke moves toward the bottom of the cylinder the energy required for this movement is substantially furnished by the energy previously stored in spring 31. A part of this stored energy is transformed in kinetic energy of the mechanical system which as a result performs the compression stroke thus generating a compression force and the remaining part of the stored energy of the spring is converted directly in compression force by the mechanical system. During the compression stroke the always acting force generated by the premagnetization must also be overcome.

The compliance with the aforementioned requirement that the point of reversal of the piston at the end of the compression stroke remains stationary within the cylinder independently of varying amplitudes of the piston stroke is obtained with the exemplification illustrated in Fig. 1 by a suitable configuration and adaptation of the components coacting for the operation of the compressor. More specifically, the respective components must have such configuration and spatial relationship that when the mechanical system is in the position corresponding to the end of the compression stroke the armature 13 is withdrawn from the pole face 16' distant from the piston by such an interval that a comparatively large air gap is formed between the armature and the respective pole face. Such a large air gap results in a correspondingly high magnetic resistance between the armature and pole face 16'. The relative disposition of the components is such that, if further so arranged that the magnetic resistance of this air gap varies with progressing departure of the mechanical system from the aforesaid point of reversal of the piston according to a function, the forces acting upon the mechanical system maintain a relationship resulting in a stationary point of reversal.

Let it be first assumed that the amplitude of the piston stroke increases. An increase in the amplitude may be due to the fact that a higher compression is required because an increased pressure develops in the device connected to the compressor. Such an increase of pressure in the device is particularly frequent with refrigerators. An increased pressure to be overcome by the pressure piston means that the piston when in its position of maximum compression or returning from this position experiences a pressure by the gaseous fluid remaining in the dead space which is higher than the pressure previously experienced. The result is that the mechanical system during its suction or return stroke is forced to move away from the bottom of the cylinder by a distance greater than the distance prior to the occurrence of the increase in pressure. Consequently, the armature will enter deeper than previously into the space defined by pole face 16'. Hence, the armature reaches a position in which the magnetic resistance between the armature and this pole face and thus the magnetic resistance of the total magnetic circuit of the electromagnet are smaller than previously.

The magnetic field produced by the pre-magnetizing current now exerts a greater force than before upon the movement of the armature. Consequently, the distance which the armature travels away from the bottom of the cylinder is increased in accordance with the increase of this force acting upon the armature. It will now be evident that by tests a magnetic resistance of the air gap along the path of displacement of the armature by tests can be ascertained which results in the desired stationary point of reversal of the piston independent of the variations in the amplitude of the piston stroke.

It will now also be apparent that when the increase in pressure is followed by a reduction in pressure back to the original value the mechanical system will re-assume a correspondingly lower amplitude of movement without change in the position of the point of reversal of the piston at the end of the compression stroke.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. An electromagnetically operated piston compressor with variable amplitude of the piston stroke for the compression of a fluid, the said compressor comprising in combination a compression cylinder, a freely slidable mechanical system including a piston axially slidable in said cylinder and armature means operatively coupled with the piston for displacement in unison therewith, stationarily mounted electromagnetic means including core means and coil means, the said electromagnetic means magnetically coacting with said armature means for effecting reciprocatory movements of the mechanical system in the direction of the piston axis by intermittent energization of said coil means, and control means coacting, during operation of the compressor, with said mechanical system for control of the reciprocatory movements thereof, the said control means including spring means and second electromagnetic means each arranged to produce a force acting upon the movements of the mechanical system in opposite axial directions, the said spring means being coupled with said mechanical system for storing and releasing respectively mechanical energy in said spring means by the reciprocatory movements of said mechanical system and being disposed so as to bias the piston in the direction of its compression stroke by a release of energy stored in the spring means, the said second electromagnetic means being controlled by the relative positions of the core means and the armature means as determined by the amplitude of the piston stroke and controlling the relative strength of said two opposite forces so as to effect a reversal of the piston at the end of its compression stroke substantially in the same axial position relative to the cylinder independently of variations in the amplitude of the piston stroke.

2. A compressor according to claim 1, wherein the said spring means are in form of a coil spring loaded by the suction stroke of the piston.

3. A compressor according to claim 1, wherein the said second electromagnetic means comprise electric means for producing a field of variable magnetic force biasing the mechanical system in the direction of the suction stroke of the piston, the force of said magnetic field being controlled by the position of the armature means relative to the core means and increasing with increasing amplitude of the piston stroke and vice versa.

4. A compressor according to claim 3, wherein the said field producing electric means comprise a source of a unidirectional potential connected in circuit with the coil means so as to supplement the magnetic field produced by the coil means upon energization of the latter, and wherein a source of an A. C. potential is provided for energizing the coil means.

5. A compressor according to claim 4, wherein an auxiliary coil means coacts electromagnetically with said coil means, the said auxiliary coil means being connected to be energized by said unidirectional potential.

6. A compressor according to claim 3, wherein the said field producing electric means comprise a source of a unidirectional potential connected across part of said coil means, and wherein a source of an A. C. potential is connected across the entire coil means.

7. A compressor according to claim 1, wherein the said coil means are connected in series with a source of alternating current and one-way rectifying means thereby feeding to said coil means unidirectional current impulses effecting said reciprocatory movements of the armature means of the mechanical system and generating the said force opposing the force produced by the mechanical means of said control means.

8. A compressor according to claim 1, wherein the said armature means are cylinder shaped, and wherein the said coil means are also cylinder shaped, the said armature cylinder being disposed freely slidable within the cylindrical space circumscribed by said coil means, and wherein said core means encompass the cylinder wall and the sides of the coil means and are formed at both ends with pole faces facing the cylindrical armature means.

9. A compressor as defined in claim 8, wherein the said armature means are formed with axially extending slots.

10. A compressor according to claim 9, wherein the said armature means are provided with a short-circuit winding.

11. A compressor according to claim 8, wherein the said core means are formed with axially extending slots.

12. A compressor according to claim 1, wherein the said mechanical means of the control means comprise yieldable means biasing the mechanical system in the direction of the compression stroke of the piston, the magnetic field force acting upon the armature means of the mechanical system in response to an energization of the coil means biasing the mechanical system for movement in the opposite direction, the said latter movement of the mechanical system storing mechanical energy in the spring means, whereby part of the stored energy is transformed in kinetic energy of the mechanical system which energy is converted by the mechanical system in the compression force required for the compression stroke of the piston and whereby the other part of the stored energy of the spring means is directly transformed by the mechanical system in the aforesaid compression force.

13. A compressor according to claim 1, wherein the said armature means are axially elongated, and wherein the said core means are formed with axially spaced pole faces facing the armature means, the said armature means and the said core means being disposed in a spatial relationship in which an air gap is formed between the armature means and the pole face distant from the piston when the piston has completed its compression stroke, the said air gap and hence the magnetic resistance between the armature means and the respective pole face being variable in accordance with the extent of the movement of the mechanical system in the direction away from the compression end position of the piston, the relative opposing forces acting upon the mechanical system following a function maintaining the point of reversal of the piston at the end of its compression stroke axially stationary relative to the cylinder independently of variations in the amplitude of the piston stroke.

14. A compressor according to claim 1, wherein the said mechanical system is guided axially slidable in two bearing means, one of the said bearing means being formed by the said cylinder and said piston slidable therein.

15. A compressor according to claim 1, wherein an adjustment member coacting with the spring means is adjustably mounted on the mechanical system for varying the loading of the spring means.

16. A compressor according to claim 1, wherein the said coil means form an auto-transformer.

References Cited in the file of this patent

UNITED STATES PATENTS

| | | |
|---|---|---|
| 496,331 | Van Depoele | Apr. 25, 1893 |
| 520,810 | Thomson | June 5, 1894 |
| 1,974,262 | Cobe | Sept. 18, 1934 |
| 2,488,384 | Dickey et al. | Nov. 15, 1949 |
| 2,495,598 | Parker | Jan. 24, 1950 |